United States Patent [19]
Kikuchi

[11] Patent Number: 5,095,388
[45] Date of Patent: Mar. 10, 1992

[54] ZOOM LENS SYSTEM
[75] Inventor: Juro Kikuchi, Tokyo, Japan
[73] Assignee: Olympus Optical Co., Ltd., Tokyo, Japan
[21] Appl. No.: 617,931
[22] Filed: Nov. 26, 1990

Related U.S. Application Data

[63] Continuation of Ser. No. 469,795, Jan. 22, 1990, abandoned, which is a continuation of Ser. No. 251,396, Sep. 30, 1988, abandoned.

[30] Foreign Application Priority Data

Oct. 2, 1987 [JP] Japan .................. 62-247980

[51] Int. Cl.$^5$ .......................... G02B 17/00
[52] U.S. Cl. ........................... 359/683; 359/676
[58] Field of Search ............... 350/423, 427, 428, 429

[56] References Cited

U.S. PATENT DOCUMENTS 4,193,667 3/1980 Yasukuni et al. .................. 350/427

FOREIGN PATENT DOCUMENTS 61-10050 3/1986 Japan .

Primary Examiner—Paul M. Dzierzynski
Attorney, Agent, or Firm—Cushman, Darby & Cushman

[57] ABSTRACT

A zoom lens system permitting photographing at definite magnification levels comprising a first lens unit and a second lens unit, and equipped with a first mechanism for varying f and $\beta$ so as to keep $f/\beta$ nearly constant and a second mechanism for varying, independently of the first mechanism, the airspace between the first lens unit and the second lens unit when the reference symbol f represents total focal length of the first lens unit and the reference symbol $\beta$ designates total lateral magnification of the second lens unit. Said zoom lens system is equipped with simple mechanisms and permits photographing objects located at distances within a broad range at optional magnification levels within a certain range.

3 Claims, 2 Drawing Sheets

ZOOM LENS SYSTEM

This is a continuation of application Ser. No. 07/469,795 filed on Jan. 22, 1990, which was abandoned upon the filing hereof, and which was a continuation of Ser. No. 07/251,396 filed Sept. 30, 1988, now abandoned.

BACKGROUND OF THE INVENTION a) Field of the Invention

The present invention relates to a zoom lens system, and more specifically a zoom lens system permitting photographing at definite magnification levels to provide images at definite magnification levels despite variation of distances to photographed objects.

b) Description of the Prior Art

For photographing objects which are coming nearer or going farther with cinematography cameras, video cameras and so on, it has conventionally been necessary to perform zooming and focusing simultaneously and continuously for photographing images of the objects while keeping constant image sizes on the imaging planes. It is difficult, even with an automatic focusing camera, to perform the operations smoothly for such photographing at a constant magnification level. Especially, highly skilled techniques are required for such photographing with the TV cameras for professional and semi-professional photographers or lowly priced video cameras equipped with no automatic focusing mechanisms.

Further, photographing must be performed at a definite magnification level when academic documents are to be prepared by macro photographing with a still camera. When a macro lens system having a single focal length is to be used for photographing for this purpose, outdoor photographing is difficult and indoor photographing is inconvenient since it is necessary to keep a constant distance from an object to an image thereof. If a zoom lens system is used in this case, it is possible to photograph an object at a constant size despite variation of distance from the object to an image thereof, however inconvenience is caused since focusing and zooming must be performed simultaneously. Furthermore, focal length of the ordinary zoom lens system may be varied when it is focused on an object located at a different distance and complicated operations are required for actual photographing at a definite magnification level.

Moreover, when lens systems are used as eyes of a robot, it is necessary to control the robot on the basis of accurate comprehension of photographing magnification. In case of the ordinary zoom lens systems used as the eyes of a robot, it is necessary to read focused and zoomed conditions on an encoder and determine magnification levels through computations for controlling the robot. That is to say, the robot must be controlled while carrying out computations on the basis of two conditions of focusing and zooming.

A method to solve the above-described problem is disclosed by Japanese Examined Published Patent Application No. 10050/61. This method comprises determination of compensator movement relative to variator as a predetermined movement different from the movement for zooming and photographing at a definite magnification level while performing focusing on an object to be photographed regardless of distance to the object to be photographed.

However, this method requires a cam (hereinafter referred to as "cam for photographing at a definite magnification level") which performs compensator movement different from the ordinary zooming movement, and shape of the cam is determined for a specific magnification level. The shape of the cam must be changed for a different magnification level. In order to make it possible to vary magnification level continuously for photographing at definite magnification levels, it is therefore necessary to change shape of the cam continuously. For making it possible to vary photographing magnification level continuously and mechanically by the above-described method, it is therefore necessary to adopt a complicated mechanism which will be highly priced even with the current electronic control technology.

In addition, it is possible to perform photographing at a nearly definite magnification levels with a relatively lowly priced lens system by using a single cam for photographing at a definite magnification level and performing photographing utilizing depth of field. However, photographing at definite magnification levels will be limited within a narrow range and magnification range will be very narrow especially for macro photographing.

SUMMARY OF THE INVENTION

A primary object of the present invention is to provide a zoom lens system having a simple mechanisms, and permitting photographing objects located at photographing distance within a broad range at optional magnification levels within a certain range.

The zoom lens system according to the present invention is characterized in that said zoom lens system comprises at least two lens units disposed on a common optical axis, that the lens unit disposed or arranged on the object side out of these lens units is movable along the optical axis and is capable of varying focal length (this lens unit will hereinafter be referred to as the first lens unit), that the lens unit disposed or arranged on the image side of said first lens unit is freely movable along the optical axis (this lens unit will hereinafter be referred to as the second lens unit), and that said zoom lens system is so designed as to keep a substantially constant value of $f/\beta$ regardless of variation of focal length f and variation of $\beta$ caused by the movement of the second lens unit when focal length of the first lens unit is represented by f and imaging magnification level of the second lens unit is designated by $\beta$.

In a preferred formation of the present invention, the zoom lens system according to the present invention is equipped with a first mechanism for varying f and $\beta$, and a second mechanism for varying the airspace reserved between the first lens unit and the second lens unit independently of the operation of the first mechanism.

Principle of the zoom lens system according to the present invention will be outlined with reference to FIG. 1 through FIG. 4.

In these drawings illustrating a lens system, G corresponds to the first lens unit and preferably consists of a plural number of lens components. Further, $G_2$ corresponds to the second lens unit an preferably consists also of a plural number of lens components.

In these drawings, the reference symbol I represents an imaging plane, the reference symbols $P_W$ and $P_T$ designate the positions conjugate with I with regard to the second lens unit $G_2$ at the wide position and the tele position respectively, the reference symbols $a_W$, $A_T$, $a_W'$ and $a_T'$ denote distances between the first lens unit $G_1$ and $P_W$ or $P_T$, the reference symbols $b_W$ and $b_T$ represent distances between $P_W$ or $P_T$ and the second lens unit $G_2$, the reference symbols $c_W$ and $c_T$ designate distances between the second lens unit $G_2$ and the photographing plane I, and the reference symbols $O_W$ and $O_T$ denote the positions conjugate with I with regard to the zoom lens system as a whole.

FIG. 1 shows a condition where the zoom lens system is focused on an object located at infinite distance at the wide position set by the ordinary zooming operation, FIG. 2 shows a condition where the zoom lens system is focused on an object located at infinite distance at the tele position set by the ordinary zooming operation, FIG. 3 illustrates a condition where the first lens unit $G_1$ is moved as a whole for a distance $x = a'_W - a_W (>0)$ toward the object side from the condition shown in FIG. 1 and FIG. 4 illustrates a condition where the first lens unit $G_1$ is moved as a whole for a distance $x = a'_T - a_T (>0)$ toward the object side from the condition shown in FIG. 2.

Now, let us calculate photographing magnification levels $M_3$ and $M_4$ of the zoom lens system as a whole in the conditions shown in FIG. 3 and FIG. 4 respectively.

Let us represent imaging magnification for the object point $O_W$ of the first lens unit $G_1$ by $\beta_{1W}$ in FIG. 3. Since the rear focal point of the first lens unit $G_1$ is coincident with the point $p_W$ conjugate with I with regard to the second lens unit $G_2$ in FIG. 1, the imaging magnification $\beta_{1W}$ is calculated as follows:

$$\beta_{1W} = -x/f_W$$

wherein the reference symbol $f_w$ represents the focal length of the first lens unit G, at the wide position.

Further, since the photographing magnification $M_3$ of the zoom lens system is equal to $\beta_{1W} \times \beta_W$, it is given by the following equation:

$$M_3 = -x\beta_W/f_W$$

wherein the reference symbol $\beta_w$ represents the magnification level of the second lens unit $G_2$ at the wide position.

Similarly, let us designate imaging magnification for the object point $O_T$ of the first lens unit $G_1$ by $\beta_{1T}$ in FIG. 4. Since the rear focal point of the first lens unit $G_1$ is coincident with $P_T$ in FIG. 2, the imaging magnification $\beta_{1T}$ is expressed as follows:

$$\beta_{1T} = -x/f_T$$

wherein the reference symbol $f_t$ represents the focal length of the first lens unit $G_1$ at the tele-position.

Since the imaging magnification level $M_4$ of the zoom lens system is equal to $\beta_{1T} \times \beta_T$, it is given by the following equation:

$$M_4 = -x\beta_T/f_T$$

Of course, as $f/\beta$ is substantially a constant, the following equations are also true:

$$M_4 = -x\beta/f \text{ and } x = -Mf/\beta.$$

wherein the reference symbol $\beta_t$ represents the magnification level of the second lens unit $G_2$ at the tele-position.

Let us now determine the condition for obtaining $M_3 = M_4$. From the relationship of $-x\beta_W/f_W = -x\beta_T/F_T$, we obtain:

$$f_T/f_W = \beta_T/\beta_W$$

Accordingly, imaging magnification for a focused object is set at a constant level when the focal length $f_A$ of the first lens unit $G_1$ and the lateral magnification $\beta_A$ of the second lens unit for the point $P_A$ conjugate with I with regard to the second lens unit $G_2$ satisfy $f_A/f_W = \beta_A/\beta_W$ in an optional condition between the wide position and the tele position, and the distance x between the rear focal point of the first lens unit $G_1$ and $P_A$ is kept at a constant value.

Further, photographing at a definite magnification level is made possible by equipping the zoom lens system with a first mechanism which is similar to the ordinary cam so composed as to move the lens units in such a manner that a constant ratio of $f/\beta$ is obtained between the focal length f of the first lens unit $G_1$ and the lateral magnification $\beta$ of the second lens unit $G_2$, and a second mechanism for varying the airspace between the first lens unit $G_1$ and in addition to the ordinary zooming cam (the first mechanism), with the second lens unit $G_2$ independently of the ordinary zooming and the ordinary focusing. Moreover, these mechanisms may be simple mechanisms each having a single cam or helicoid, and are manufacturable at low cost.

In practice, it is conceivable to adopt a method to shift the first lens unit $G_1$ and the second lens unit $G_2$ so as to obtain a target magnification level, i.e., to set a magnification level with the second mechanism and adjust distance from an object to an image with the first mechanism, or another method to set a photographing magnification level by varying the distance between the frist lens unit $G_1$ and the second lens unit $G_2$ with the second mechanism while focusing the zoom lens system on an object to be used as a standard of image size with the first mechanism, and then focus the zoom lens system on another object located at a different distance with the first mechanism.

Out of the methods described above, the latter requires rather complicated operations since the first and second mechanisms must be operated in a certain correlation. However, the operations can be simplified by using an automatic focusing mechanism in combination with the second mechanism at the stage to set a photographing magnification level since such a means make it sufficient to perform the variation of the distance between the first lens unit $G_1$ and the second lens unit $G_2$.

In the foregoing description, switching from $x \neq 0$ to $x = 0$ (x: variation of the distance between the first lens unit $G_1$ and the second lens unit $G_2$) i.e., switching from the ordinary photographing condition to the photographing condition at a definite magnification level is performed with the zoom lens system focused on an object located at infinite distance. It is not necessary to set $x = 0$ at the switching point.

However, the switching may be performed in a condition where the lens system is focused on an object located at any distance so long as $f/\beta$ is kept constant after the switching. Further, when the first lens unit $G_1$ is designed as a variable refractive index element which is made of an elastic material and has a shape variable to change the refractive index thereof, it is possible to vary the focal length f even with a single element. In an actual lens system, image size may be varied due to distortion even at the same paraxial magnification level. In such a case, it is possible to cancel the variation due to distortion at the required portion of the image by adequately varying value of $f/\beta$. Assuming that $D_{hW}$ represents distortion at an image height of h when the focal length f has a value of $f_W$ and that $D_{hA}$ designates distortion at the image height of h when the focal length f has a value of $f_A$, it is sufficient to adjust the value $f_A/\beta_A$ of $f/\beta$ at the focal length of $f_A$ so as to be $(f_W/\beta_W) \times \{(1-D_{hA}/100)\}$ for cancelling the distortion at the image height of h when the focal length is $f_A$.

When $f/\beta$ is adjusted to $f_A/\beta_A$ after a target value $f_A/\beta_A$ of $f/\beta$ is determined taking distortion in to consideration, distortion is varied. This variation of distortion results in a slight variation of target value $f_A/\beta_A$. However, $f_A/\beta_A$ is converged to a certain value by repeating the adjustment and a required precision can be obtained by repeating the adjustment. Further, even when the value of $f/\beta$ is varied slightly, it is possible to perform photographing nearly at a definite magnification level if required precision is not so high.

Since ±10% is considered as limits of magnification variation allowable for the ordinary photographing, the following values may be considered as limits for photographing at a definite magnification level:

$$1.22 \geq |f/\beta|_{max} / |f/\beta|_{min} \geq 1$$

wherein the reference symbols $|f/\beta|_{max}$ and $|f/\beta|_{min}$ represent maximum and minimum values of $f/\beta$ respectively.

Furthermore, a definite magnification level is kept constant in the focused condition so long as the distance $\overline{FP}$ between the rear focal point F of the first lens unit $G_1$ and the point P conjugate with the imaging plane with regard to the second lens unit $G_2$ is kept constant during photographing at the definite magnification level despite the movement of the first mechanism. In an actual lens system, however, magnification level may be varied due to spherical aberration and chromatic aberration. Accordingly, in order to obtain an accurate imaging magnification level, it is necessary to set $\overline{FP}$ and distance $\overline{SK}$ from the second lens unit $G_2$ to the imaging plane taking into consideration the deviations of the first lens unit $G_1$ and the second lens unit $G_2$ due to the aberrations. Assuming that adjustment degrees of these distances are represented by $\Delta\overline{FP}_a$ and $\Delta\overline{SK}_a$ respectively, these degrees cannot be determined uniquely since they are related in a complicated manner to aberration conditions, pupil position, magnification levels of the first lens unit $G_1$ and the second lens unit $G_2$, etc. However, it is considered that these degrees are nearly proportional to the longitudinal aberration $\delta_a$ on the imaging plane and within a range from some fractions to several times of the longitudinal aberration $\delta_a$.

The zoom lens system according to the present invention is so designed as to be always set at a definite magnification level in a focused condition thereof and focusing precision must be enhanced to stabilize the magnification level.

When focusing precision is low, magnification level is unstable for photographing at a definite magnification level. Assuming that $\Delta\overline{FP}$ represents precision of value of $\overline{FP}$ determined depending on focusing precision in such a case, it is insignificant to set variation of $\overline{FP}$ smaller than $\Delta\overline{FP}$ and it is sufficient to keep variation of $\overline{FP}$ on the order of $\Delta\overline{FP}$. When focusing precision in the direction along the optical axis on the imaging plane is designated by $\delta_F$, value of $\Delta\overline{FP}$ is on the order of $\delta F/\beta 2$.

In addition to the mode of operation described above, it is possible to adopt the operation mode disclosed by Japanese Examined Published Patent Application No. 10050/61. That is to say, a focused condition can be obtained by adjusting in such a manner that an image of an object is kept at a constant size when the distance from the object to an image thereof is varied. In this case, it is sufficient to select precision of the distance $\overline{FP}$ satisfying depth of field. Error $\Delta\overline{FP}_l$ in this case is on the order of $\delta L/\beta 2$ when depth of field is represented by $\delta_L$.

DETAILED DESCRIPTION OF THE PREFERRED EMBODIMENT

Figure 1:
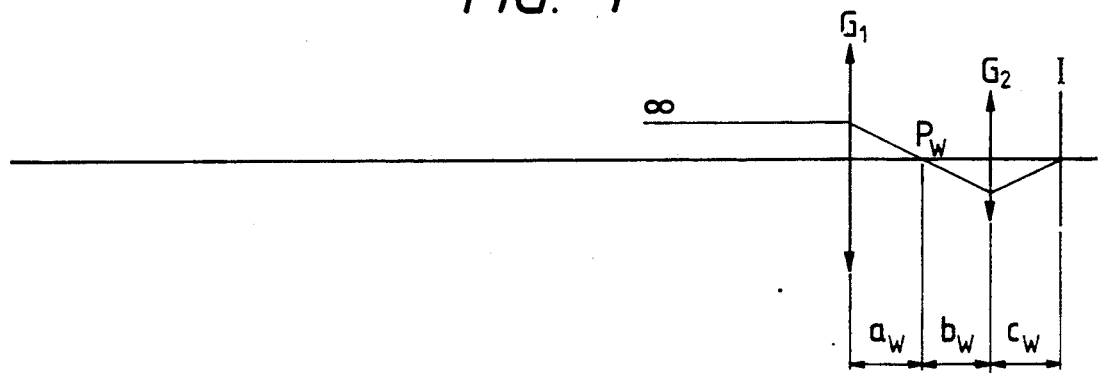
FIG. 1 through FIG. 4 show illustrations descriptive of the principle of the zoom lens system according to the present invention.
Figure 2:
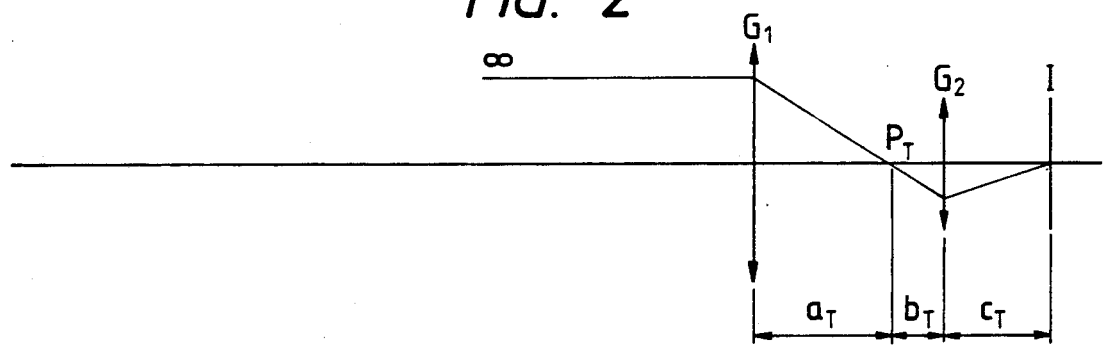
Figure 3:
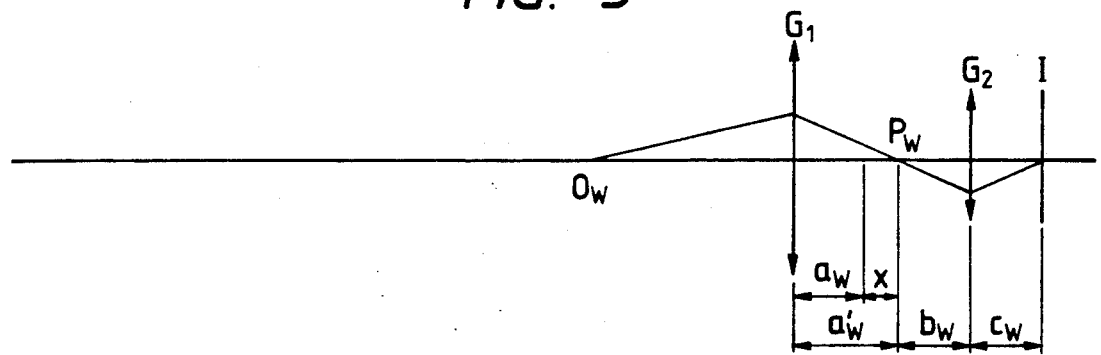
Figure 4:
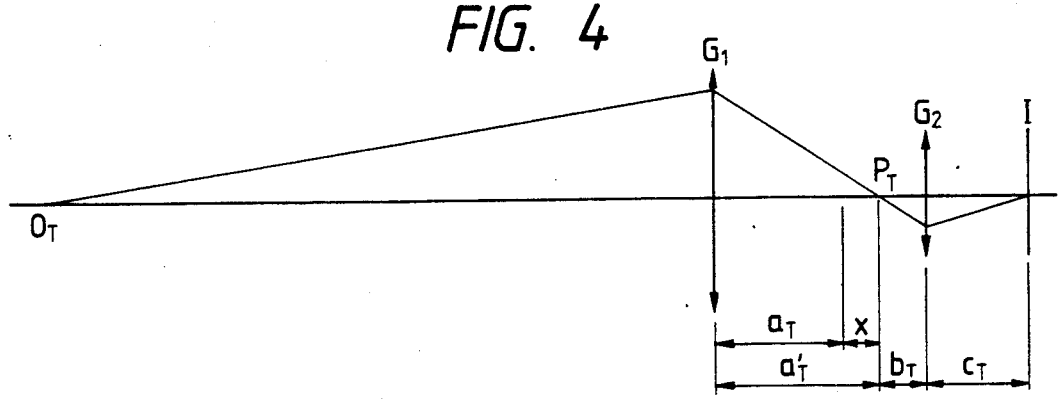
Figure 5:
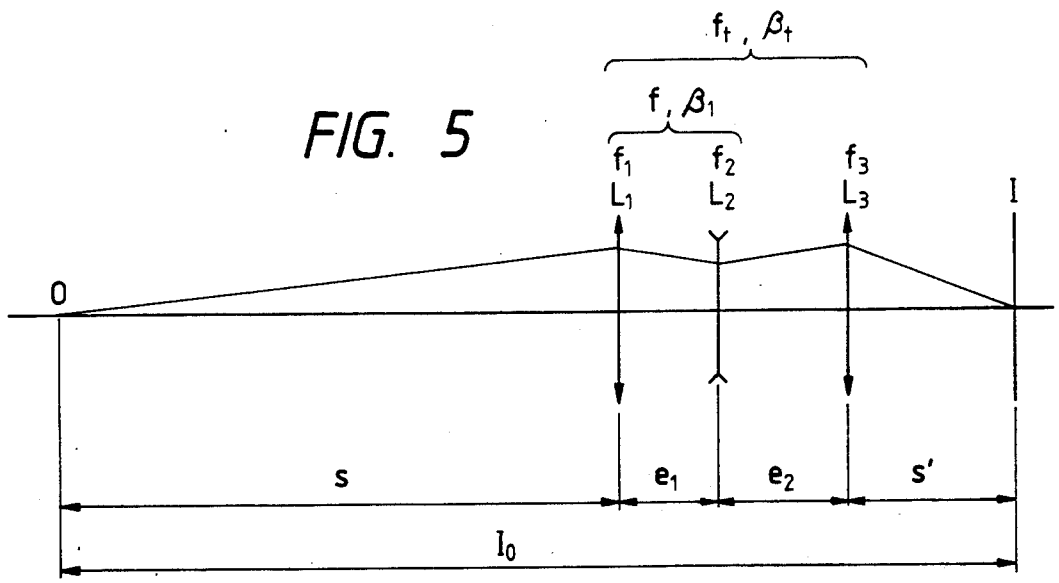
FIG. 5 shows a scheme illustrating composition of an embodiment of the zoom lens system according to the present invention.

Now an embodiment of the zoom lens system according to the present invention will be described. FIG. 5 shows composition of an embodiment of the present invention. This embodiment comprises three lens components: a first lens component $L_1$ and a second lens component $L_2$ composing a first lens unit $G_1$ whereas a third lens component $L_3$ composing a second lens unit $G_2$. The embodiment has the numerical data shown in the following Tables 1 through 3:

TABLE 1

| | | | | $f_1 = 50$, $f_2 = -20$, $f_3 = 33$ Focused on infinite distance | | | | |
|---|---|---|---|---|---|---|---|---|
| $f_t$ | S | $e_1$ | $e_2$ | S' | f | $\beta_1$ | $\beta$ | IO |
| 35 | ∞ | 1.429 | 32 | 66 | −35 | 0 | −1 | ∞ |
| 49 | ∞ | 5.853 | 24.325 | 72.046 | −41.413 | 0 | −1.183 | ∞ |
| 63 | ∞ | 8.704 | 18.814 | 77.274 | −46.957 | 0 | −1.342 | ∞ |
| 77 | ∞ | 10.737 | 14.483 | 81.947 | −51.913 | 0 | −1.483 | ∞ |
| 91 | ∞ | 12.281 | 10.891 | 86.211 | −56.436 | 0 | −1.612 | ∞ |
| 105 | ∞ | 13.504 | 7.804 | 90.158 | −60.622 | 0 | −1.732 | ∞ |

TABLE 2

| | Photographing at a definite magnification of −0.02× | | | | | | | |
|---|---|---|---|---|---|---|---|---|
| $\beta_t$ | S | $e_1$ | $e_2$ | S' | f | $\beta_1$ | $\beta$ | IO |
| −0.02 | −1712.5 | 1.429 | 32.7 | 66 | −35 | 0.02 | −1 | 1812.629 |
| −0.02 | −2396.469 | 5.853 | 25.025 | 72.046 | −41.413 | 0.0169 | −1.183 | 2499.393 |
| −0.02 | −3082.606 | 8.704 | 19.514 | 77.274 | −46.957 | 0.0149 | −1.342 | 3188.098 |
| −0.02 | −3770.217 | 10.737 | 15.183 | 81.947 | −51.913 | 0.0135 | −1.483 | 3878.084 |
| −0.02 | −4458.910 | 12.281 | 11.591 | 86.211 | −56.436 | 0.0124 | −1.612 | 4568.994 |
| −0.02 | −5148.446 | 13.504 | 8.504 | 90.158 | −60.622 | 0.0115 | −1.732 | 5260.611 |

TABLE 3

| | | | Photographing at a definite magnification of −0.3× | | | | | |
|---|---|---|---|---|---|---|---|---|
| $\beta_t$ | S | $e_1$ | $e_2$ | S' | f | $\beta_1$ | $\beta$ | IO |
| −0.3 | −79.167 | 1.429 | 42.5 | 66 | −35 | +0.3 | −1 | 189.095 |
| −0.3 | −109.802 | 5.853 | 34.825 | 72.046 | −41.413 | 0.2535 | −1.1832 | 222.526 |
| −0.3 | −142.606 | 8.704 | 29.314 | 77.274 | −46.957 | 0.2236 | −1.342 | 257.898 |
| −0.3 | −176.883 | 10.737 | 24.983 | 81.947 | −51.913 | 0.2023 | −1.483 | 294.550 |
| −0.3 | −212.244 | 12.281 | 21.391 | 86.211 | −56.436 | 0.1861 | −1.612 | 332.127 |
| −0.3 | −248.446 | 13.504 | 18.304 | 90.158 | −60.622 | 0.1732 | −1.732 | 370.411 |

In these tables, the reference symbols $f_1$, $f_2$ and $f_3$ represent focal lengths of the fist lens component $L_1$, the second lens component $L_2$ and the third lens component $L_3$ respectively, the reference symbols $e_1$ and $e_2$ designate distance between the principal points of the first lens component $L_1$ and the second lens component $L_2$, and distance between the second lens component $L_2$ and the third lens component $L_3$ respectively, the reference symbols S and S' denote distance from the first lens component $L_1$ to the object point and distance from the third lens component $L_3$ to the image point respectively, the reference symbol f represents total focal length of the first lens component $L_2$ and the second lens component $L_2$ (the first lens unit $G_1$), the reference symbol $\beta_1$ designates total lateral magnification of the first lens component $L_1$ and the second lens component $L_2$ (the first lens unit $G_1$), the reference symbol $\beta$ represents lateral magnification of the third lens component $L_3$ (the second lens unit $G_2$), the reference symbol $f_t$ represents focal length of the zoom lens system as a whole, the reference symbol $\beta_t$ represents total lateral magnification of the zoom lens system as a whole, and the reference symbol IO designates distance from the object to the image.

Out of the tables shown above, Table 1 shows movements of the individual lens components for the ordinary zooming with the zoom lens system focused on an object located at infinite distance.

As is understood from this table, value of $f/\beta$ is kept constant since the ordinary zooming cam has the function of the first mechanism which keeps value of $f/\beta$ constant.

Further, Tables 2 and 3 list conditions where magnification levels for photographing at definite magnification levels are set at −0.02× and −0.3× respectively.

As is understood from these tables, the distance $e_2$ is varied independently of the ordinary zooming. Variations of the distance are 0.7 at the magnification level of −0.02× and 10.5 at the magnification level of −0.3×.

The second mechanism is used for varying the distance $e_2$ independently of the ordinary zooming as described above.

Under the present circumstance where advanced electronic control technique is available, it is possible to use a focusing mechanism independent of the above-described first mechanism and the second mechanism. Any one of the lens components can be moved by the focusing mechanism but it will be the simplest to move the first lens component. When any type of focusing mechanism is adopted as the third mechanism, the requirement of constant $f/\beta$ is made unsatisfied by focusing with the third mechanism. For photographing at a definite magnification level with the zoom lens system equipped with the third mechanism, it is therefore necessary to keep the zoom lens system focused on an object located at infinite distance with the third mechanism.

Owing to the first and second mechanisms described above, the zoom lens system according to the present invention permits photographing accurately at definite magnification levels, adjustment within a broad range, has simple composition and is manufacturable at a low cost. In other words, the second mechanism permits setting magnification level for photographing at definite magnification levels and, in addition, continuously varying magnification level. On the other hand, the first mechanism permits focusing for photographing at definite magnification levels with a photographing magnification kept at a constant level. Furthermore, the zoom lens system according to the present invention allows to determine a photographing magnification level uniquely with the second mechanism, and accordingly reduces amount of computations and facilitates control when the zoom lens system is used as an eye of an industrial robot since the zoom lens system can ordinarily be focused with the first mechanism while kept at a definite magnification level and the second mechanism is operated only when magnification level is to be varied.

I claim:

1. A zoom lens system permitting photogrpahing at a constant imaging magnification level regardless of variation of an object point, said lens system comprising:

a first lens unit and a second lens unit being arranged on a common optical axis in the order recited from the object side;

said first lens unit having a variable focal length and being movable as a whole along the optical axis;

said second lens unit being movable along the optical axis;

a moving distance x of said first lens unit relative to said second lens unit being given as $x = -M_4 \cdot f/\beta$ regardless of variation of said focal lens f and variation of the imaging magification level $\beta$ of said second lens unit being caused by the movement thereof, the magnification in level of said zoom lens system being kept substantially constant regardless of the variation of object point and being represented by $M_4$; and $f/\beta$ having a substantially constant value regardless of the variation of said focal length f and the variation of said imaging magnification level $\beta$ of said second lens unit caused by the movement thereof.

2. A zoom lens according to claim 1 wherein said first lens unit is movable along the optical axis so as to keep, regardless of the movement of said second lens unit, a substantially constant distance between the point conjugate with a predetermined image plane of said zoom lens system as a whole with regard to the lens units taken as a whole arranged on the image side of said first lens unit and the rear focal point of said first lens unit.

3. A zoom lens system permitting photographing at definite magnification levels according to claim 2 comprising a third focusing mechanism operating independently of the second mechanism.

* * * * *